(12) United States Patent
Kransmo et al.

(10) Patent No.: US 7,215,967 B1
(45) Date of Patent: May 8, 2007

(54) SYSTEM AND METHOD FOR FAST COLD START OF A GPS RECEIVER IN A TELECOMMUNICATIONS ENVIRONMENT

(75) Inventors: Jan Lennart Kransmo, Plano, TX (US); Christopher Hugh Kingdon, Garland, TX (US); Leland Scott Bloebaum, Cary, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/219,199

(22) Filed: Dec. 22, 1998

(51) Int. Cl.
H04Q 7/20 (2006.01)

(52) U.S. Cl. .............. 455/456.2; 455/13.2; 455/456.1; 342/357.06

(58) Field of Classification Search .......... 455/422, 455/450, 456–458, 432, 435–436, 12.1, 13.2, 455/422.1, 432.1, 456.1, 456.2, 456.5, 456.6; 342/357.09, 357.1, 357.06, 357.12, 357.15
See application file for complete search history.

(56) References Cited

U.S. PATENT DOCUMENTS

| | | | | |
|---|---|---|---|---|
| 4,445,118 A | * | 4/1984 | Taylor et al. ................. 343/357 |
| 4,983,980 A | * | 1/1991 | Ando ..................... 342/357.15 |
| 5,185,610 A | * | 2/1993 | Ward et al. .................. 342/357 |
| 5,223,843 A | * | 6/1993 | Hutchinson .................. 342/352 |
| 5,223,844 A | * | 6/1993 | Mansell et al. .............. 342/357 |
| 5,365,450 A | * | 11/1994 | Schuchman et al. ....... 455/456.3 |
| 5,477,228 A | * | 12/1995 | Tiwari et al. ................ 342/357 |
| 5,502,446 A | * | 3/1996 | Denninger ................... 342/357 |
| 5,535,278 A | * | 7/1996 | Cahn et al. .................... 380/49 |
| 5,629,693 A | * | 5/1997 | Janky ......................... 340/988 |
| 5,663,734 A | * | 9/1997 | Krasner .................. 342/357.12 |
| 5,663,735 A | * | 9/1997 | Eshenbach ................... 342/357 |
| 5,796,365 A | * | 8/1998 | Lewis ......................... 342/357 |
| 5,812,087 A | * | 9/1998 | Krasner ....................... 342/357 |
| 5,841,396 A | * | 11/1998 | Krasner ...................... 342/357 |
| 5,872,539 A | * | 2/1999 | Mullen ........................ 342/357 |
| 5,874,914 A | * | 2/1999 | Krasner .................. 342/357.12 |
| 5,883,594 A | * | 3/1999 | Lau .......................... 342/357.1 |
| 5,899,957 A | * | 5/1999 | Loomis ....................... 701/214 |
| 5,913,170 A | * | 6/1999 | Wortham .................... 455/457 |
| 5,987,319 A | * | 11/1999 | Hermansson et al. ....... 455/422 |
| 6,011,974 A | * | 1/2000 | Cedervall et al. ............ 455/456 |
| 6,070,078 A | * | 5/2000 | Camp, Jr. et al. ........... 455/456 |
| 6,075,987 A | * | 6/2000 | Camp, Jr. et al. ........... 455/427 |
| 6,081,691 A | * | 6/2000 | Renard et al. ............. 455/12.1 |
| 6,094,168 A | * | 7/2000 | Duffett-Smith et al. ..... 342/463 |
| 6,108,558 A | * | 8/2000 | Vanderspool, II ........ 455/456.2 |
| 6,114,991 A | * | 9/2000 | Richton et al. .......... 342/357.1 |

(Continued)

*Primary Examiner*—William Trost
*Assistant Examiner*—James D. Ewart

(57) ABSTRACT

A telecommunications system and method for rapid start-up of a Global Position System (GPS) receiver integrated with a mobile terminal is disclosed. The location of a reference GPS receiver associated with a Base Transceiver Station (BTS) within the cell that the mobile terminal is currently located is used as the local position estimate for that mobile terminal. The GSM TDMA frame numbers are first correlated with the GPS clock signal. Optionally, this correlation is adjusted using the adaptive frame alignment mechanism. This local position estimate is used to ascertain the location of the GPS receiver. The correlation data is then sent to the GPS-capable mobile terminal through the Short Messaging Service (SMS) cell broadcast facility or the Broadcast Control Channel (BCCH) facility of the GSM network to enable the built-in GPS receiver to calculate its position relatively quickly.

17 Claims, 12 Drawing Sheets

U.S. PATENT DOCUMENTS

| | | | |
|---|---|---|---|
| 6,133,874 A * | 10/2000 | Krasner | 342/357.15 |
| 6,150,980 A * | 11/2000 | Krasner | 342/357.1 |
| 6,249,245 B1 * | 6/2001 | Watters et al. | 342/357.03 |
| 6,256,475 B1 * | 7/2001 | Vannucci | 455/12.1 |
| 6,307,504 B1 * | 10/2001 | Sheynblat | 342/357.06 |
| 6,356,763 B1 * | 3/2002 | Kangas et al. | 455/456.1 |
| 6,477,379 B2 * | 11/2002 | Kingdon | 455/456.1 |
| 6,538,600 B1 * | 3/2003 | Richton et al. | 342/357.1 |

* cited by examiner

SYSTEM AND METHOD FOR FAST COLD START OF A GPS RECEIVER IN A TELECOMMUNICATIONS ENVIRONMENT

CROSS REFERENCE(S) TO RELATED APPLICATIONS

This nonprovisional U.S. patent application contains subject matter related to copending Nonprovisional U.S. patent application Ser. No. 09/063,028 entitled "System and Method for Provisioning Assistance Global Positioning System Information to a Mobile Station", filed on Apr. 20, 1998, in the names of Christopher H. KINGDOM, Bagger R. ZADEH and Jan Lennart KRANSMO. This nonprovisional U.S. patent application also contains subject matter related to now abandoned Provisional U.S. Patent Application Ser. No. 60/096,436, entitled "Method for Improving Signal Acquisition in a Global Positioning System Receiver", filed on Aug. 13, 1998, in the name of Leland Scott BLOEBAUM. These earlier-filed related Provisional & Nonprovisional U.S. patent applications and the disclosures contained therein are hereby incorporated by reference herein.

BACKGROUND OF THE PRESENT INVENTION

1. Technical Field of the Invention

The invention relates to the field of integrated telecommunications systems comprising Global Positioning System (GPS) receivers within mobile terminals, and more specifically to a system and method for improving the cold start time of an integrated GPS receiver.

2. Description of Related Art

The cellular telecommunications industry has made phenomenal strides in commercial operations throughout the world. Cellular telecommunications is one of the fastest growing and most demanding telecommunications applications ever. Today it represents a large and continually increasing percentage of new telephone subscriptions around the world. Growth in major metropolitan areas has so far exceeded initial expectations. If this trend continues, the effects of rapid growth will soon reach even the smallest markets. This continual growth has revealed the existence of a considerable customer demand for value added services. Innovative solutions are required to meet these needs for product and service differentiation while maintaining high quality service without unduly raising prices. One such value added service is locating the geographic position of a mobile terminal.

Determining the geographical position of a mobile station within a cellular network or other Public Land Mobile Network (PLMN) has recently become important for a wide range of applications. For example, positioning services may be desired by transport and taxi companies to determine the location of their vehicles and to improve the efficiency of dispatch procedures. In addition, for emergency calls, e.g., 911 calls, knowing the exact location of a mobile terminal may be vital in ensuring a positive outcome in emergency situations.

Furthermore, positioning services can be used to determine the location of a stolen car, to identify home zone calls which may be charged at a lower rate, to detect hot spots in a micro cell, or to provide premium subscriber services, e.g., the Where Am I service. The Where Am I service facilitates the determination of, for example, the location of the nearest gas station, restaurant, or hospital to a mobile station.

One technique for determining the geographic position of a mobile station is to use the satellite-based Global Positioning System (GPS). GPS is a satellite navigation system that provides specially coded satellite signals that can be processed in a GPS receiver to yield the position, velocity and time of a receiving unit. Four or more GPS satellite signals are needed to compute the three-dimensional locational coordinates and the time offset of a receiver clock relative to a fixed coordinate system.

The GPS system comprises twenty-four satellites (not counting spares) that orbit the Earth in approximately twelve hours. The satellite orbits repeat virtually the same ground track once every day. The orbital altitude of the GPS satellites (20,200 Km) is such that the satellites repeat the same ground track and configuration over any point approximately once every twenty-four hours. There are six orbital planes each nominally with four satellites in each, that are equally spaced (i.e., 60° apart) and inclined at about 55° relative to the equatorial plane of the Earth. This constellation arrangement ensures that between five and eight satellites are visible to users from any point on Earth.

The satellites of the GPS system offer two levels of precision in determining the position, velocity and time coordinates at a GPS receiver. The bulk of the civilian users of the GPS system use the Standard Positioning Service (SPS) which has a predictable accuracy of ±100 meters horizontally, ±156 meters vertically and ±340 ns time accuracy. The Precise Positioning Service (PPS) is available to only to authorized users having cryptographic equipment and keys and specially equipped receivers.

Each of the GPS satellites transmit two microwave carrier signals. The L1 frequency (centered at 1575.42 MHZ) carries the navigation message as well as the SPS code signals. The L2 frequency (centered at 1227.60 MHZ) is used to measure the ionospheric delay by receivers compatible with the PPS system.

The L1 and L2 microwave carrier signals are modulated by three binary codes: a 1.023 MHZ Coarse Acquisition (C/A) code, a 10.23 MHZ Precise Code (P-Code) and a 50 Hz Navigational System Data Code (NAV Code). The C/A code is a pseudorandom number (PRN) code that uniquely characterizes a GPS satellite. All of the GPS satellites transmit their binary codes over the same L1 & L2 carriers. The multiple simultaneously-received signals are recovered by a Code Division Multiple Access (CDMA) correlator. The correlator in a civilian GPS receiver first recovers the C/A Code as modulated by the NAV Code. A Phase Locked Loop (PLL) circuit then separates out the C/A Code from the NAV Code. It should be emphasized that a GPS receiver first needs to determine its approximate location in order to determine which of the GPS satellites are within range. Conversely, a GPS receiver that knows its approximate position can tune faster into the signals transmitted by the appropriate GPS satellites.

The startup of a GPS receiver typically requires the acquisition of a set of navigational parameters from the navigational data signals of four or more GPS satellites. As explained elsewhere in this application, this process of initializing a GPS receiver may often take several minutes.

The duration of the GPS positioning process is directly dependent upon how much information a GPS receiver has. Most GPS receivers are programmed with almanac data, which coarsely describe the expected satellite positions for up to one year ahead. However, if the GPS receiver does not have some knowledge of its own approximate location, then the GPS receiver cannot correlate signals from the visible satellites fast enough, and therefore, cannot calculate its position quickly. Furthermore, it should be noted that a higher signal strength is need for capturing the C/A Code and the NAV Code at start-up than is needed for continued monitoring of an already-acquired signal. It should also be noted that the process of monitoring the GPS signal significantly affected by environmental factors. Thus, a GPS signal which may be easily acquired in the open becomes progressively harder to acquire when a receiver is under foliage, in a vehicle, or worst of all, in a building.

Recent governmental mandates, e.g., the response time requirements of the FCC Phase II E-911 service, make it imperative that the exact position of a mobile handset be determined in an expedited manner. Thus, in order to implement a GPS receiver effectively within a mobile terminal while also meeting the demands for expedited and accurate positioning, it has become necessary to be able to quickly provide mobile terminals with accurate assistance data, e.g., local time and position estimates, satellite ephemeris and clock information (which may vary with the location of the mobile station). The use of such assistance data can permit a GPS receiver that is integrated with or connected to a mobile station to expedite the completion of its start-up procedures. It is therefore desirable to be able to send the necessary assistance GPS information over an existing wireless network to a GPS receiver that is integrated with or connected to a mobile terminal.

SUMMARY OF THE INVENTION

It is therefore a primary object of the present invention to reduce the start up time of GPS receivers associated with mobile stations. It is a further object of the present invention to provide improved performance of GPS receivers integrated with a mobile terminal by transmitting data that can assist in the fast acquisition of a GPS navigational data signal over a wireless network. It is also an object of the present invention to devise a system that meets the response time requirements the FCC Phase II E-911 service. It is an additional object of the invention to permit the speedy acquisition of approximate locational information by a GPS receiver under environmental conditions where the signal strength is low.

The system and method of the present invention offers a technique for assisting the fast cold start of a Global Position System (GPS) receiver integrated with or connected to a mobile terminal. This is accomplished by having one or more reference GPS receivers located throughout the cellular network, each reference GPS receiver being capable of providing locally accurate lists of GPS satellites within ranging distance and the associated ephemeris, clock and differential correction information relating to one or more GPS satellites.

The location of the Base Transceiver Station (BTS) serving the cell that the mobile terminal is currently located in is used as the initial position estimate for that mobile terminal. This initial position estimate is used to ascertain the nearest reference GPS receiver and the navigational data is then sent to the GPS-equipped mobile terminal through the wireless telecommunications network to enable the built-in GPS receiver to coarsely estimate its position relatively quickly.

In one aspect, the present invention is a system and method for improving the cold start efficiency of a GPS receiver in a mobile terminal that is under the operational control of a Base Transceiver Station (BTS). A reference GPS receiver connected to the BTS first acquires the signals from four or more GPS satellites. In the preferred embodiment, the GPS receivers tune into the L1 frequency (centered at 1575.42 MHZ). In an alternative embodiment, the GPS receivers tune into the high-precision) L2 frequency (1227.60 MHZ).

The Code Division Multiple Access (CDMA) satellite signals are demodulated at the reference GPS receiver. The 50 Hz navigational data signal is recovered from each of the demodulated GPS satellite signals. In an alternative embodiment of the present invention, the reference GPS receiver computes its actual physical location.

When the GPS-equipped mobile terminal first powers up or in certain other situations when the GPS signal is too attenuated to permit the initialization of the GPS receiver associated with the mobile terminal, the mobile terminal sends a request to the BTS requesting approximate navigational data. In another embodiment the mobile terminal requests the BTS to directly transmit actual locational data to the mobile terminal.

Upon receiving a request for approximate navigational data from the GPS-equipped mobile terminals, the BTS transmits the navigational data bit stream (or the actual physical locational information) to the invoking mobile terminals. In one embodiment of the present invention, this transmission from the BTS to the GPS-equipped mobile terminal takes place as a Short Message Service Cell Broadcast. In an alternative embodiment, this transmission takes place over the Broadcast Control Channel (BCCH) of the wireless telecommunications system. The GPS-equipped mobile terminal uses the transmitted navigational data bitstream to speedily acquire the GPS signals from the (four or more) optimally situated satellites in the GPS constellation.

In an extension of the present invention, the BTS periodically monitors the exact radial location of the mobile terminals and transmits a Timing Advance parameter to the GPS-equipped mobile terminal to dynamically compensate for the varying distances between the mobile terminal and the Base Transceiver Station. In such a case, the GPS-equipped mobile terminal uses this Timing Advance parameter to refine its estimate of the approximate location of the GPS-equipped mobile terminal.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein.

DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

By way of background, the European Telecommunications Standards Institute (ETSI) established a standardization group in 1982 to formulate the specifications for the Global System for Mobile (GSM) Communication digital mobile cellular radio system. The ETSI GSM Standard uses Time Division Multiple Access (TDMA) Channel Multiplexing Scheme.

Figure 1:
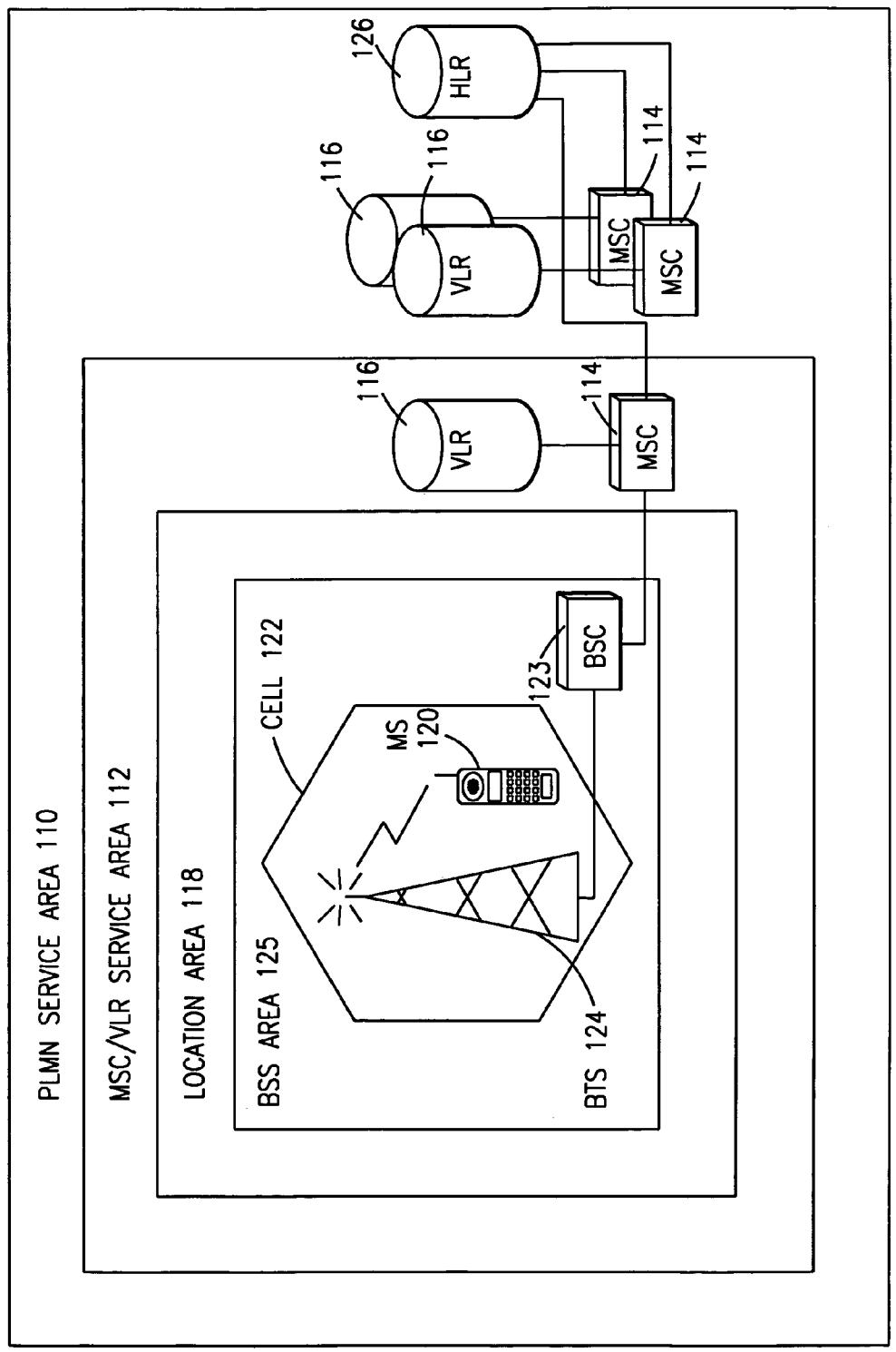
FIG. 1 is a block diagram of a conventional terrestrially-based wireless telecommunications system.

FIG. 1 illustrates a Public Land Mobile Network (PLMN), such as the exemplary GSM cellular network 110, which in turn comprises a plurality of MSC/VLR Service Areas 112, each with a Mobile Switching Center (MSC) 114 and an associated Visitor Location Register (VLR) 116. The MSC/VLR Service Areas 112, in turn, include a plurality of Location Areas (LAs) 118, which are defined as that part of a given MSC/VLR Service Area 112 in which a mobile terminal or a mobile station (MS) 120 may move freely without having to update its location to the MSC 114 and/or VLR 116 that controls the LA 118. Each Location Area 118 is further divided into a number of cells 122. The exemplary Mobile Station 120 is the physical equipment, e.g., a car phone or other portable telephone, that is used by a mobile subscriber to communicate with the cellular network 110, with other mobile subscribers, or with other parties outside the subscriber network, whether wireline or wireless.

The MSC 114 is in communication with at least one Base Station Controller (BSC) 123, which, in turn, is in contact with at least one Base Transceiver Station (BTS) 124. The BTS is the physical equipment, illustrated for simplicity as a radio tower in FIG. 1, that resources radio coverage to the cell 122 for which it is responsible. It should be understood that the various BSCs 123 may be connected to several BTS's 124, and may be implemented as stand-alone nodes or integrated with the MSC 114. In either event, the BSC 123 and BTS 124 components, as a whole, are generally referred to as a Base Station System (BSS) 125.

With further reference to FIG. 1, each PLMN Service Area or cellular network 110 includes a Home Location Register (HLR) 126, which is a database containing subscriber information, e.g., user profiles, current location information, International Mobile Subscriber Identity (IMSI) number, and other administrative information, for subscribers who are registered within the PLMN 110. The HLR 126 may be co-located with a specific MSC 114, integrated with MSC 114, or (as illustrated in FIG. 1) service multiple MSCs 114.

The VLR 116 is a database containing information about the plenary set of MSs 120 that are located within an MSC/VLR Service Area 112. If an MS 120 moves into a new physical location such as a new MSC/VLR Service Area 112 (not shown in FIG. 1), the VLR 116 associated with the MSC 114 requests information about the MS 120 from the HLR 126 (while simultaneously informing the HLR 126 about the new location of the MS 120). Accordingly, when the user of the MS 120 wants to make a call, the local VLR 116 will have the requisite subscriber identification information without having to reinterrogate the HLR 126.

Figure 2:
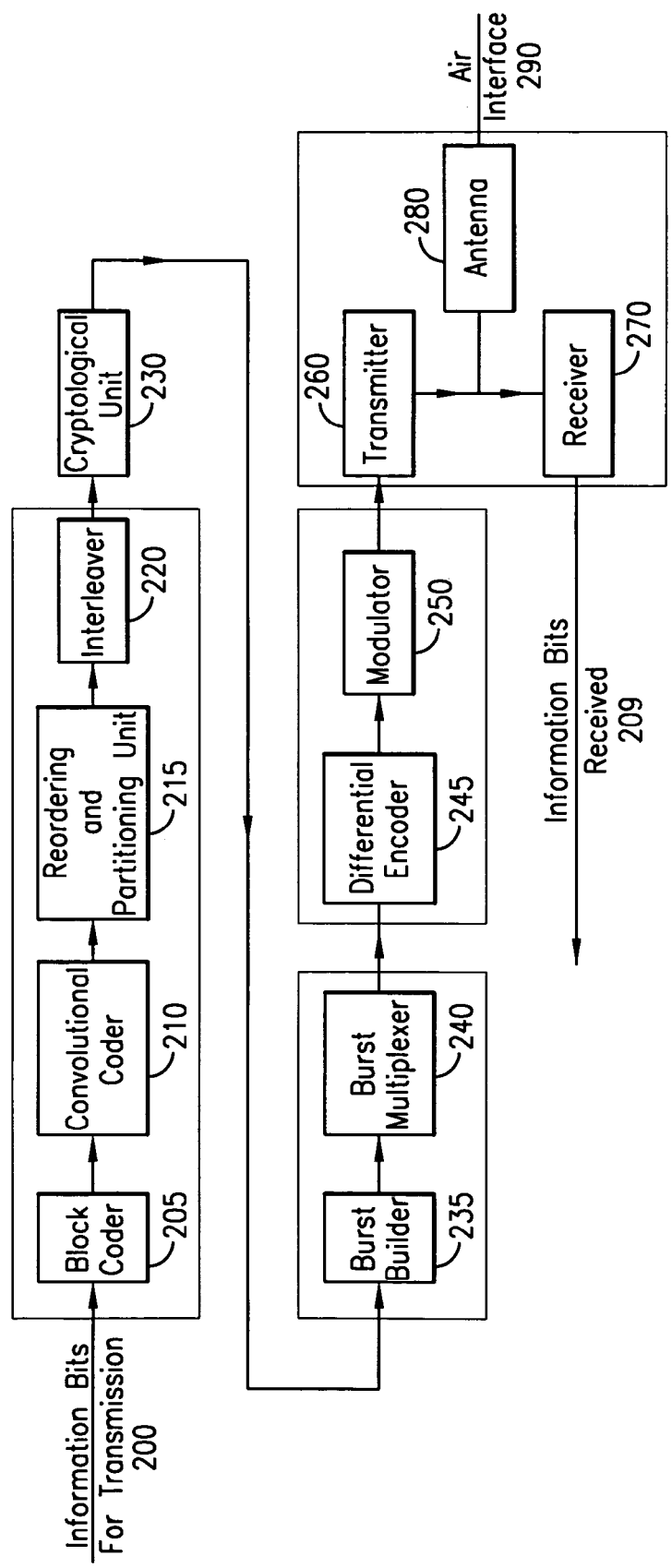
FIG. 2 shows the reference configuration of the transmission chain in a GSM TDMA telecommunications system.

FIG. 2 shows the reference configuration of the transmission chain in a GSM TDMA telecommunications system. It should be emphasized that the reference configuration shows only the transmission path of a GSM TDMA system and does not expressly define the specification of an associated receiver. As shown in FIG. 2 the information bits 200 that are to be transmitted are first fed into the coder 205 that performs block coding. The block coding, which includes the addition of parity bits to the information bits 200, provides some error detection and correction capabilities.

The block coded information and parity bits are then fed into a convolutional coder 210, as shown in FIG. 2. The output of the convolutional coder are reordered and partitioned at 215 before being interleaved over multiple transmission bursts at 220. The interleaved bits are then fed into an optional cryptological unit 230 to generate encrypted bits. These encrypted bits are then fed to a burst builder 235 before being burst multiplexed at 240 in conformance with the GSM standard set forth by ETSI. The output of the burst multiplexer 240 are then fed to a differential encoder 245 before being modulated at 250. The modulated bits are then fed to a transmitter 260 and thence via an antenna 280 to the air interface 290.

In the reverse direction, the incoming signals received by the antenna 280 over the air interface 290 are fed to a receiver 270. The received information bits 209 are then extracted by a receiver unit for functional compatibility with the processing performed in the transmit direction as explained above.

The basic GSM access scheme is Time Division Multiple Access (TDMA) with eight basic physical channels per carrier. The carrier separation is 200 KHz. A physical channel is therefore defined as a sequence of TDMA frames as additionally specified by a time slot number and a frequency hopping sequence. The basic radio resource is a time slot that lasts 15/26 ms (i.e. 576.9 µs) and which transmits information at a modulation rate of approximately 270.833 Kbits/s. This means that the duration of each time slot (including the guard time) is 156.25 bits. Eight time slots constitute a TDMA frame. Thus a TDMA frame has a duration of 4.615 ms (60/13 ms).

Figure 3:
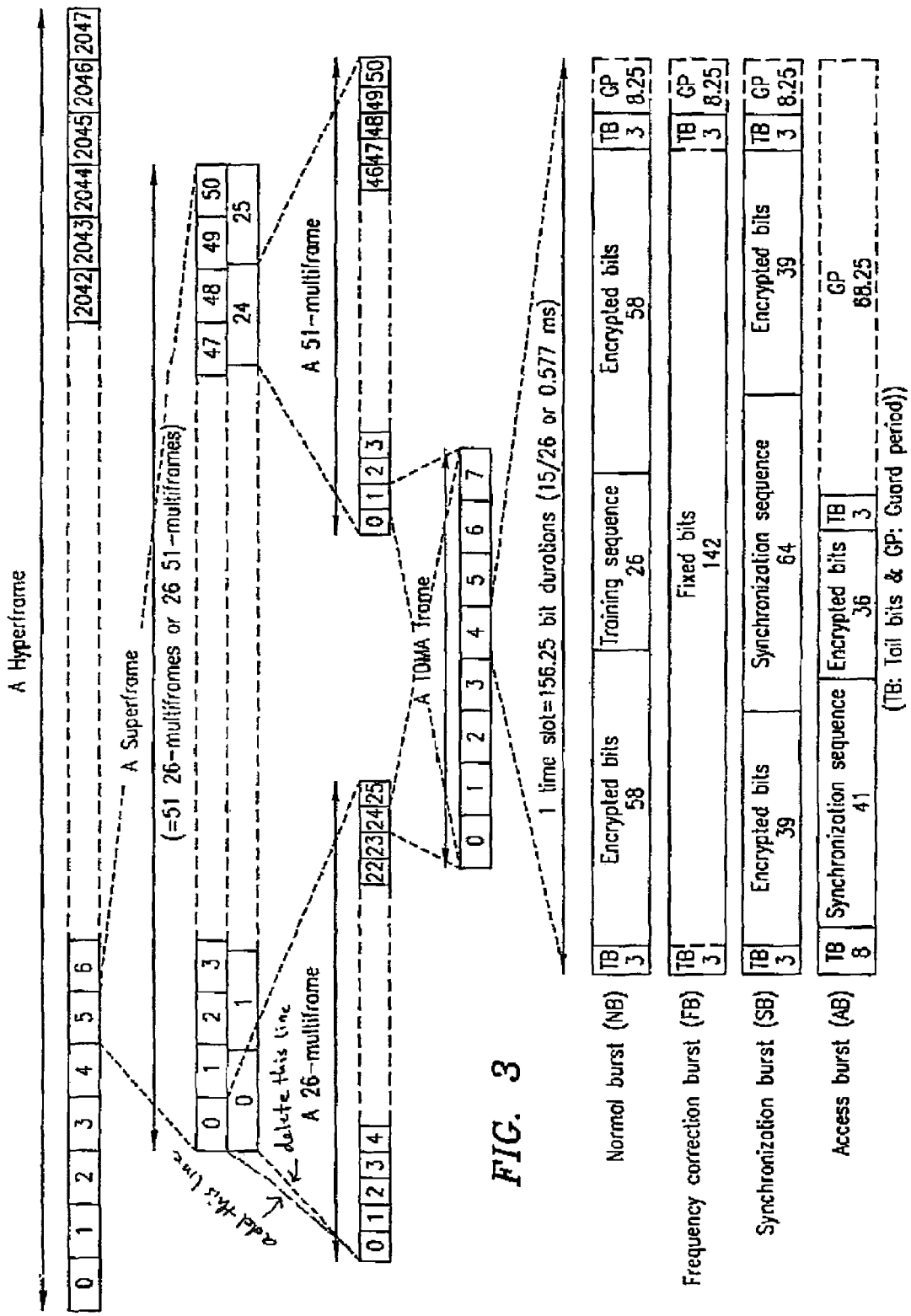
FIG. 3 is a diagrammatic representation of the GSM TDMA timeframe structures.

A diagrammatic representation of the GSM TDMA time-frame structures is depicted in FIG. 3. The longest recurrent time period of the structure is called a hyperframe and has a duration of 3 h, 28 m, 53 s and 760 ms. GSM TDMA frames are numbered by a Frame Number (FN). The Frame Number (FN) is a cyclic count of successive TDMA frames that runs the range from 0 to 2,715,647 (i.e., 2048×51×26−1, also known as FN_MAX). The Frame Number is incremented at the end of each TDMA frame. The complete cycle of TDMA frame numbers from 0 to 2,715,647 is referred to as a hyperframe. This long period is needed to support certain cryptographic mechanisms defined by the ETSI GSM specification.

A GSM TDMA hyperframe is divided into 2,048 superframes each of which has a duration of 6.12 s. The superframe is the least common multiple of the GSM TDMA time frame structures. The superframe itself is further divided into three kinds of multiframes: 26-multiframes, 51-multiframes and 52-multiframes.

The first kind of the GSM TDMA multiframes is the 26-multiframe which comprises 26 TDMA frames having a total duration of 120 ms. Consequently, a GSM TDMA superframe can have 51 such 26-multiframes. 26-multiframes are used to carry Traffic Channels (TCH) and associated control channels (including Slow Associated Control Channels (SACCH) and Full-rate Associated Control Channels (FACCH)).

The second type of GSM TDMA multiframe is a 51-multiframe, comprising 51 TDMA frames and having a total duration of 235.4 ms. A GSM TDMA superframe can have 26 such 51-multiframes. 51-multiframes are used to support broadcast, common control and stand alone dedicated control (and their associated control channels), including, e.g., Broadcast Control Channel (BCCH), Common Control Channel (CCCH) & Stand-alone Dedicated Control Channels (SDCCH) or Packet Broadcast Control Channel (PBCCH) & Packet Common Control Channel (PCCCH).

The third type of GSM TDMA multiframe is a 52-multiframe comprising 52 TDMA frames and having a total duration of 240 ms. A GSM TDMA Superframe can have 25.5 such 52-multiframes. The TDMA frames in a 52-multiframe are numbered from 0 to 51. The 52-multiframe format is used to support packet data traffic and control channels, e.g., Packet Broadcast Control Channel (PBCCH), Packet Common Control Channel (PCCCH), Packet Associated Control Channel (PACCH) & Packet Data Traffic Channel (PDTCH).

As noted earlier, a TDMA frame is made up of eight time slots and has a duration of 4.615 ms (60/13 ms). Each time slot is a time interval of approximately 576.9 μs (15/26 ms), i.e., 156.25 bit durations, and its physical content is called a burst. As shown in FIG. 3, four different types of bursts are used in the GSM TDMA system.

The first type of burst is the so-called Normal Burst (NB), which contains 116 encrypted bits and includes a guard time of 8.25 bit durations (approximately 30.46 μs). Normal bursts are used to carry information on traffic and control channels, except for the Random Access Channel (RACH).

The second type of burst is the so-called Frequency Correction Burst (FB), which contains 142 fixed bits and includes a guard time of 8.25 bit durations (approximately 30.46 μs). Frequency Correction Bursts are used for frequency synchronization of mobile terminals. FBs are equivalent to an unmodulated carrier, that is shifted in frequency, but having the same guard time as the normal burst. FBs are broadcast together with the BCCH. The repetition of FBs is also referred to as the frequency correction channel (FCCH).

The third type of burst is the so-called Synchronization Burst (SB), which contains 78 encrypted bits and a guard period of 8.25 bits. Synchronization Bursts contain a 64-bit long training sequence and carry the information about the TDMA frame number (FN) as well as the Base Station Identity Code (BSIC). SBs are used for time synchronization of a mobile terminal and are broadcast together with the frequency correction burst (FB). The repetition of SBs is also referred to as the synchronization channel (SCH).

The fourth type of burst is the so-called Access Burst (AB). Access Bursts are used for random access and are characterized by a longer guard period (68.25 bit durations or 252 μs) to cater for burst transmissions from mobile terminals which may know the timing advance at the time of first access (or following a handover). This longer guard period allows for a mobile station to be up to 35 km from a base station transceiver. In exceptional cases the design may be compatible with cases where the cell radii is larger than 35 Km. ABs are used in the (Packet) Random Access Channel (PRACH), after a handover, on the uplink of a channel used for a voice group call in order to request the use of that uplink, as well as on the uplink of the Packet Traffic Control Channel (PTCCH) to allow estimation of the timing advance for a mobile station in packet transfer mode.

For standard GSM systems operating in the 900 MHZ band, the mobile station transmissions (and concomitantly the reception by the base stations) occur in the 890–915 MHZ band while the base station transmissions (and concomitantly the mobile station reception) occur in the 935–960 MHZ band. In the Extended GSM 900 mode of operation, mobile station transmissions take place in the 880–915 MHZ band while the base station transmissions take place in the 925–960 MHZ band. Thus, GSM systems operating in the 900 MHZ band have 194 Radio Frequency (RF) channels having an RF channel spacing of 200 KHz.

In the DCS 1800 mode of GSM operation, mobile station transmissions take place in the 1710–1785 MHZ band while base station transmissions take place in the 1805–1880 MHZ. This provides 374 Radio Frequency channels each having an RF channel spacing of 200 KHz.

The ETSI GSM Specification provides for frequency hopping. Frequency hopping capabilities may be used by a network operator to provide diversity on one transmission link and also to average the quality on all the communications through interference diversity. The principle of slow frequency hopping is to have every mobile station transmit its time slots over a fixed sequence of frequencies that are derived from a frequency hopping algorithm. The frequency hopping takes place between two successive time slots and hence a mobile station that transmits or receives on a fixed frequency during one time slot needs to hop to the next frequency (as specified by the frequency hopping algorithm) before its time slot comes up on the next TDMA frame. The frequency hopping sequences are orthogonal inside one cell. This ensures that no collisions occur between communications in a single cell. However, the frequency hopping sequences are independent from one cell to an adjacent homologous cell.

The frequency hopping sequence is derived by the mobile station from parameters that are broadcast at the time of channel assignment. These broadcast parameters include the mobile frequency allocation which specifies the set of frequencies over which the mobile station is to hop, the hopping sequence number of the cell (which allows different sequences to be used on homologous cells) as well as the index offset (which helps distinguish multiple different mobile stations within a cell that use the same mobile allocation). It should be noted that a basic physical channel supporting the Broadcast Control Channel (BCCH) does not frequency hop.

The Cell Broadcast Channel (CBCH) has 228 bits per block, comprising 184 bits of data, 40 bits of parity and 4 bits are tail bits of the convolutional code. The blocks are convolutionally coded at a code rate of ½ resulting in a total of 456 coded bits/block. The blocks are interleaved to a depth of four over a number of bursts. A Broadcast Control Channel (BCCH) transmission, like a Cell Broadcast Channel (CBCH) transmission, has 228 bits per block, comprising 184 data bits, 40 parity bits and 4 tail bits, which are convolutionally coded at a ½ code rate result in 456 coded bits/block. However, unlike CBCH transmissions, BCCH transmissions are interleaved to a depth of six over a number of bursts.

One technique for determining the geographic position of an object (or a mobile station) is to use the satellite-based Global Positioning System (GPS). GPS technology is used in many military and civilian applications. GPS is a satellite navigation system that provides specially coded satellite signals that can be processed in a GPS receiver to yield the position, velocity and time at a receiving unit. Four or more GPS satellite signals are needed to compute the three-dimensional locational coordinates and the time offset of a receiver clock relative to a GPS master clock.

Figure 4:
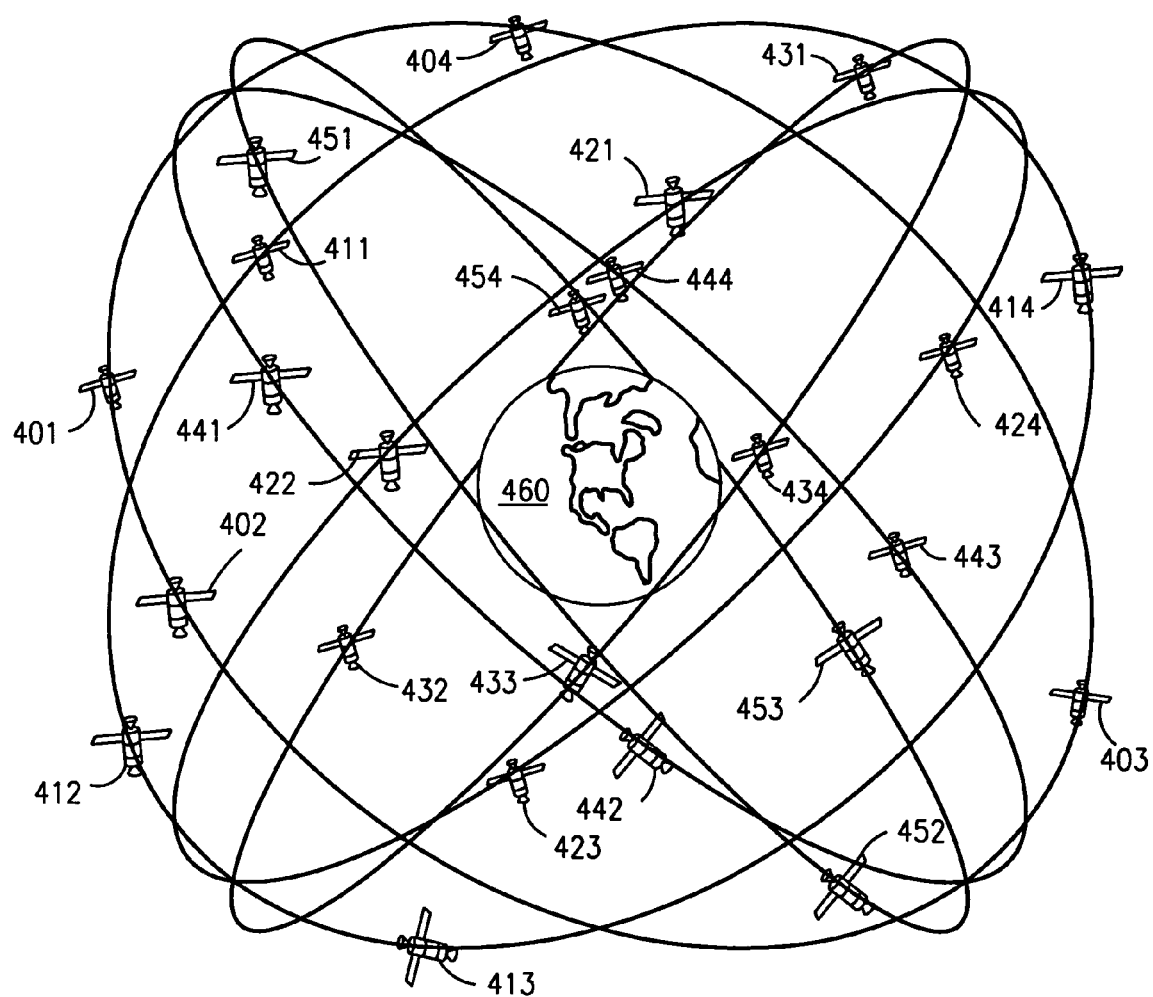
FIG. 4 shows the nominal constellation of the Global Positioning System (GPS) satellites.

The nominal constellation of the GPS satellites is shown in FIG. 4. The GPS system 400 comprises twenty-four satellites 401–454 (not counting spares) that orbit the Earth 460 in approximately twelve hours. The satellite orbits repeat virtually the same ground track once every day. The orbital altitude of the GPS satellites is such that the satellites repeat the same ground track and configuration over any point on Earth approximately once every twenty-four hours. As shown in FIG. 4, the GPS satellites operate in circular 20,200 km (10,900 nm) orbits in six equally-spaced orbital planes inclined at 55° to the Earth's equational plane. Each orbital plane has four satellites (not counting spares). The spacing of the satellites in orbit is so arranged that a minimum of five (and a maximum of eight) satellites are visible from any point on Earth.

The GPS satellites are currently controlled by a set of five land-based control facilities. The master control facility is located in Colorado. The monitor stations receive signals from the satellites that are incorporated into the orbital models for each of the satellites. The models compute precise orbital data (ephemeris data) and satellite clock corrections for each individual satellite. The master control station uploads ephemeris and clock data to the satellites. The satellites then send subsets of the orbital ephemeris data to GPS receivers as radio signals.

Figure 5:
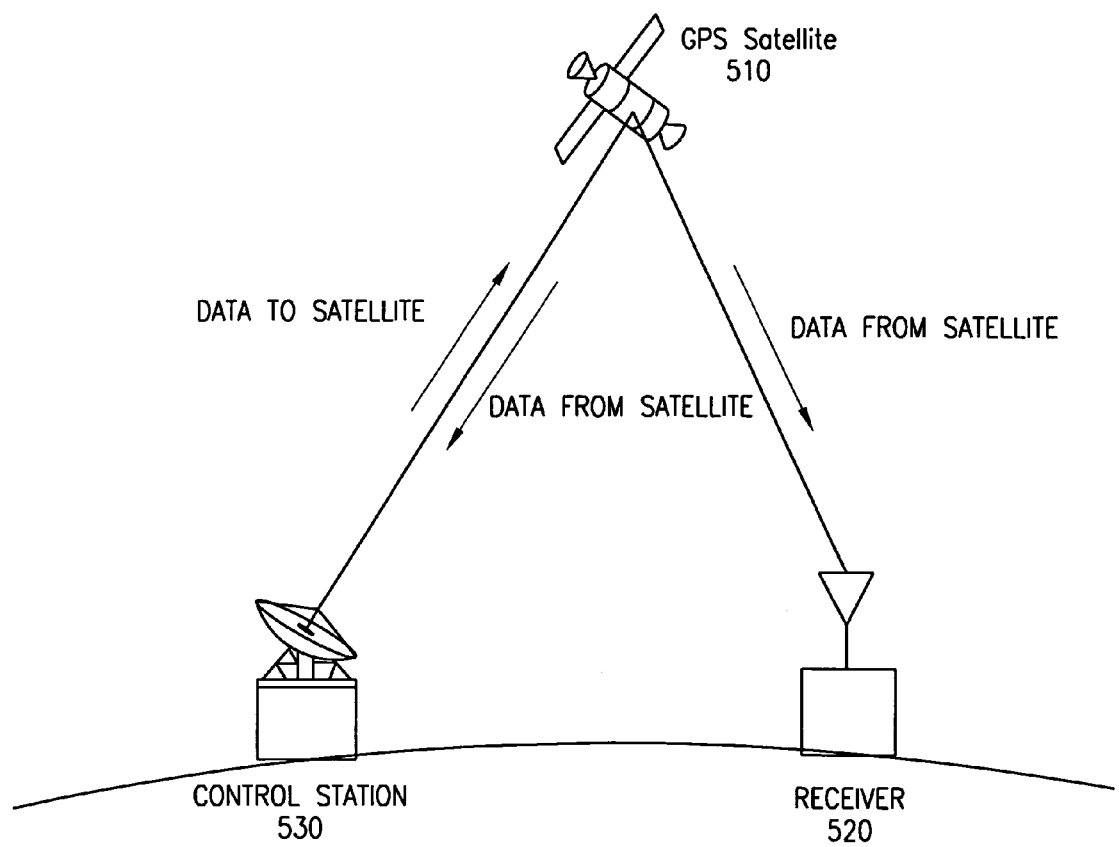
FIG. 5 shows the data interchange between a GPS control station, a GPS satellite and a GPS receiver.

This is illustrated in FIG. 5 where an exemplary GPS satellite 510 is shown to communicate with an exemplary GPS receiver 520 over a unidirectional radio frequency data link. The GPS satellite 510 also communicates with the GPS Master Control Station 530 over a bidirectional radio frequency data link that permits the GPS satellite to download information to the control station 530 as well as to receive ephemeris and clock correction data from the control station 530.

Figure 6:
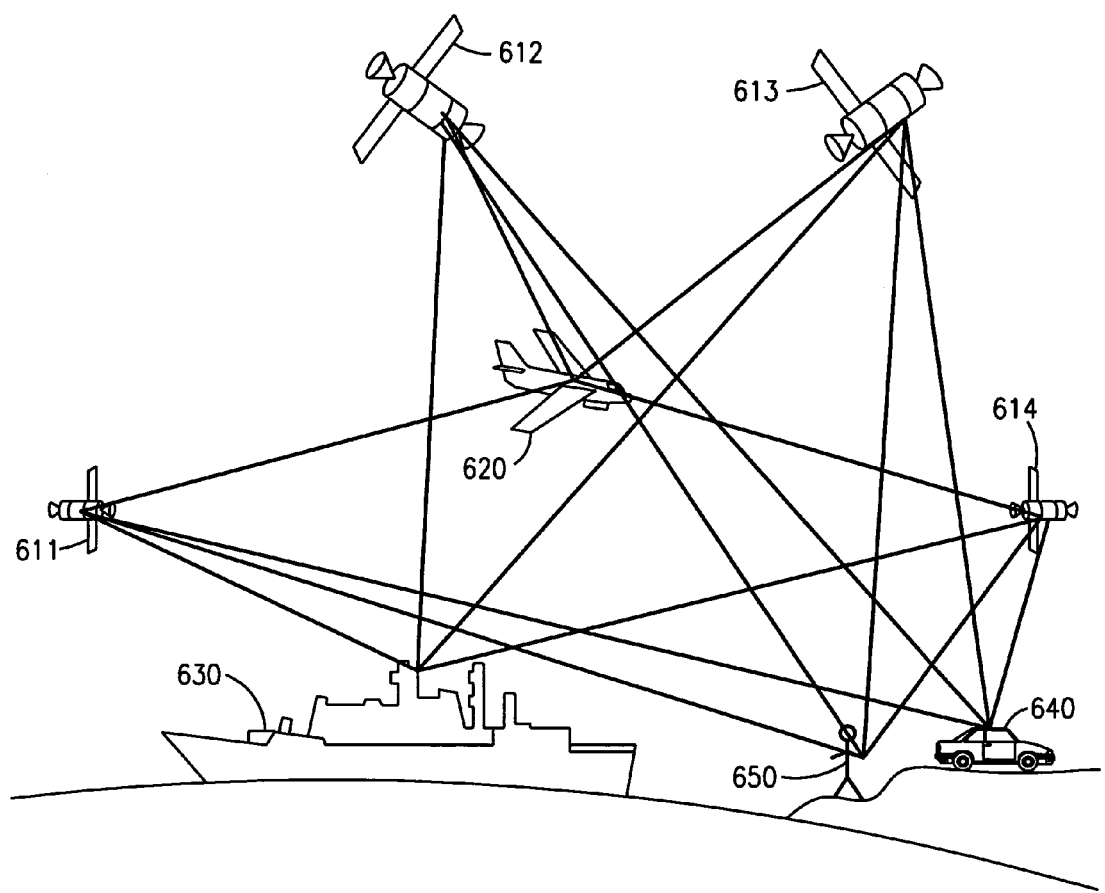
FIG. 6 is an exemplary illustration of the use of GPS navigational system in aerial, marine and terrestrial applications.

FIG. 6 shows the potential usage of GPS navigational system by aerial, marine and terrestrial receivers. As mentioned earlier, facilitating three dimensional navigation is the primary function of the GPS. GPS receivers convert satellite signals into position, velocity and time estimates. A minimum of four satellites 611–614 are required to compute the three dimensions of position (in cartesian or polar coordinates) and time. GPS navigation receives are made for use on aircraft 620, ships 630, ground vehicles 640, as well as for hand carrying by individual users 650.

As noted earlier, the GPS system offers two levels of precision in determining the position, velocity and time coordinates at a GPS receiver. The bulk of the civilian users of the GPS system use the Standard Positioning Service (SPS) without charge or governmental restrictions. Most commercially-available GPS receivers are capable of receiving and using the SPS signal. The accuracy of the SPS signals is intentionally degraded by the U.S. Department of Defense. The SPS service has a predictable accuracy of ±100 meters horizontally, ±156 meters vertically and ±340 ns time accuracy.

The Precise Positioning Service (PPS) is available to authorized users having cryptographic equipment and keys and specially equipped receivers. The PPS has a predictable accuracy of ±22 meters horizontally, ±27.7 meters vertically and ±100 ns time accuracy.

Figure 7:
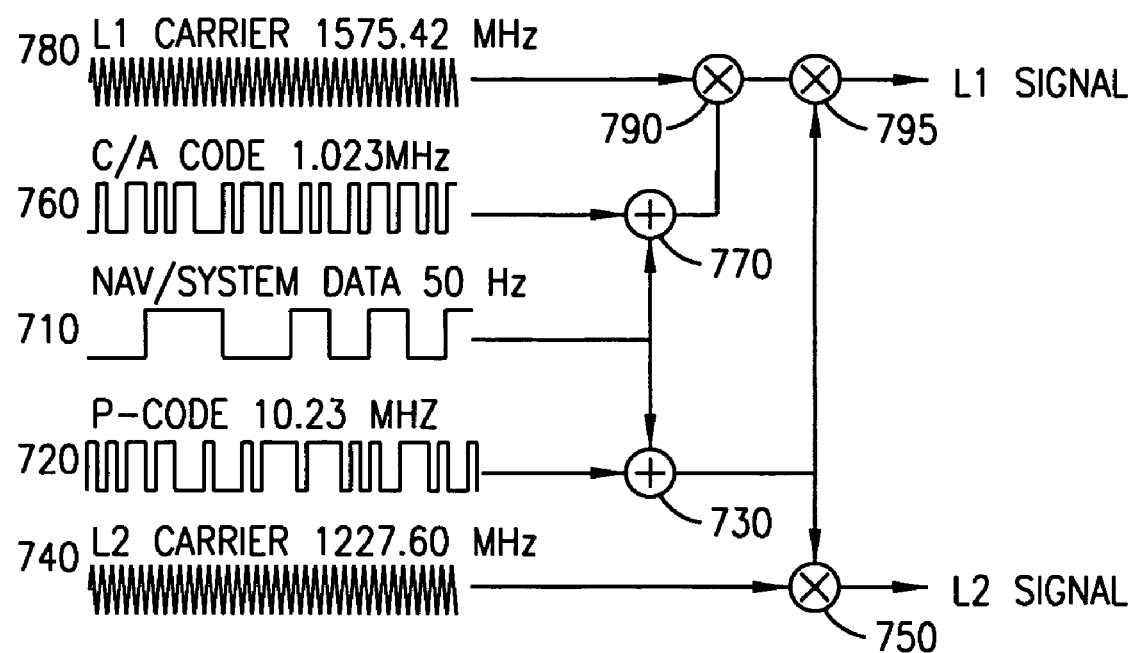
FIG. 7 shows the signals generated by a GPS satellite.

FIG. 7 shows the signals generated by a GPS satellite. Each of the GPS satellites transmit two microwave carrier signals, called the L1 and the L2 signals. The L1 frequency (centered at 1575.42 MHZ) carries the navigation message and the SPS code signals. As described earlier, the navigation message transmitted by each satellite includes a unique 1023-chip Gold (PRN) code at a rate of 1.023 MHZ, such that the full PRN code sequence repeats at one millisecond intervals.

The L2 frequency (centered at 1227.60 MHZ) is used to measure the ionospheric delay by PPS equipped receivers.

The L1 and L2 microwave carrier signals are phase-shifted by three binary codes. The first of these is the Coarse Acquisition (C/A) code that modulates the phase of the L1 carrier. The C/A signal is a repeating 1.023 MHZ Pseudo Random Number (PRN) code that is also a maximal-length shift register sequence. This noise-like code modulates the L1 carrier signal and spreads the spectrum over a 1 MHZ bandwidth. The C/A code is repeated every 1023 bits (i.e., every millisecond). Each GPS satellite has a different C/A PRN code. GPS satellites are often identified by their PRN number, which is a unique identifier for each of the PRN codes. The C/A code that modulates the L1 carrier is the basis for the civilian SPS service.

The second of the binary codes that modulate the L1 and L2 carrier is the Precise Code (P-Code) that modulates the phases of both the L1 and L2 carriers. The P-Code is a very long, 10.23 MHZ PRN code, that takes seven days to transmit completely. In the Anti-Spoofing (AS) mode of operation, the P-Code is encrypted into the Y-Code. The encrypted Y-Code requires a classified AS module for each receiver channel. The Y-Code is intended for use only by authorized users having the appropriate cryptographic keys. The P-Code (or the Y-Code) serves as the basis for the PPS signal.

The third of the binary codes is the Navigational/System Data message that modulates the L1 C/A code signal. The navigation message is a 50 Hz data signal that describe the orbits of the GPS satellites, the clock corrections and other system parameters as described below.

As shown in FIG. 7, the NAV Code 710 is first summed with the P-Code 720 in the Modulo 2 Summer 730 before modulating the L2 carrier 740 in the Mixer 750. At the same time, the NAV Code 710 is summed with the C/A Code 760 in the Modulo 2 Summer 770 before modulating the L1 Carrier 780 in the Mixer 790. The output of the Mixer 790 is then further mixed (as shown at 795) with the summed NAV Code and P-Code signal that is output by the Modulo 2 Summer 730. The output of the Mixer 795 is the modulated L1 signal while the output of the Mixer 750 is the modulated L2 signal.

Figure 8:
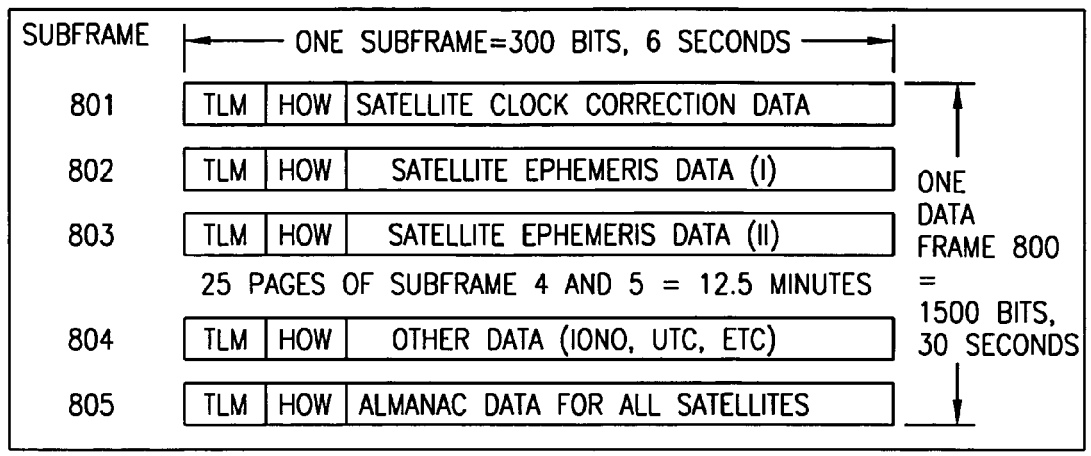
FIG. 8 shows the format of the navigation data signals generated by a GPS satellite.
Figure 8:
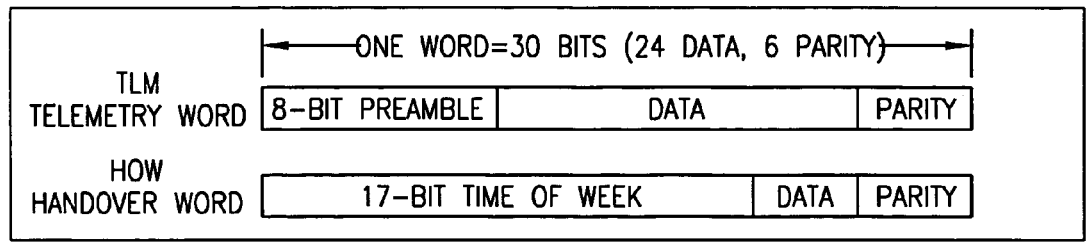

FIG. 8 shows the format of the navigation data signals generated by a GPS satellite. The GPS navigation message consists of time tagged data bits marking the time of transmission of each subframe at the time they are transmitted by the satellite. The GPS Navigational Data frame comprises 1500 bits divided into five 300-bit (six-second) subframes 801–805. A data frame is transmitted every thirty seconds by each of the GPS satellites. The first three of the five subframes contain orbital and clock data: the satellite clock corrections are sent in the first subframe 801 while the ephemeris data parameters for the transmitting satellite are sent in the second and third subframes 802 and 803, respectively. The fourth and fifth subframes 804 and 805, respectively, are used to transmit different pages of system data. An entire set of 25 frames (i.e., 125 subframes) makes up the complete navigation message that is sent over a time interval of 12.5 minutes. The Data subframes 801–805 contain parity bits that permit error detection and limited error correction.

The clock data parameters sent in subframe 801 describe the satellite clock and the GPS time. The ephemeris data parameters transmitted in subframes 802 and 803 describe the satellite orbits for short sections of the satellite orbits. Normally, a GPS receiver gathers new ephemeris data each hour. However, the GPS architecture permits all data to be reused for up to four hours without introducing an excessive amount of error. The ephemeris parameters are used with an algorithm that computes the satellite position for any time within the period of orbit described by the ephemeris parameter set.

The unique 50 Hz Navigational/System Data message transmitted by each satellite contains parameters that allow GPS receivers on earth to compute a precise position solution. The navigation message includes a precise time reference as well as parameters that precisely describe the orbital positions and clock corrections for each of the GPS satellites. In general, GPS receivers compute a position solution by first searching for all visible satellites. This task is accomplished by correlating the received signal with replicas of the respective Gold codes, demodulating the Navigational Data message broadcast by each of the visible satellites to obtain a time reference and orbital position, computing a range estimate for each visible satellite that includes the GPS receiver clock uncertainty, and, if at least four satellites are visible, computing the GPS receiver position and clock correction using the range estimates.

Almanacs are approximate orbital data parameters for all of the satellites of the GPS system. The ten parameter almanacs describe satellite orbits over extended period of time which may be useful for several months in certain cases. A set of ten parameter almanacs for all satellites is sent by each satellite over a period of 12.5 minutes or more as described earlier. The signal acquisition time at receiver startup can be significantly aided by the availability of current almanacs. The proximate orbital data as received at a receiver is used to preset the receiver at the approximate position and carrier Doppler frequency (the frequency shift caused by the rate of change in range to the moving satellite) of each satellite in the GPS constellation.

As noted earlier, the GPS system permits the efficient and accurate calculation of the position and time of a GPS receiver that may move at a speed of up to 500 Kmph. The GPS system has multiple modes of usage. Code phase tracking is used for GPS-based navigation. In code phase tracking, the GPS receiver produces replicas of the Coarse Acquisition (C/A) (i.e., the PRN code) and/or the P-Code. Each Pseudo Random Number (PRN) code is a noise-like but predetermined unique series of bits. The receiver produces the C/A code sequence for a specific satellite using some form of a code generator. Modern receivers usually store a complete set of precomputed C/A code chips in memory although a hardware-based shift register implementation may also be used.

Figure 9:
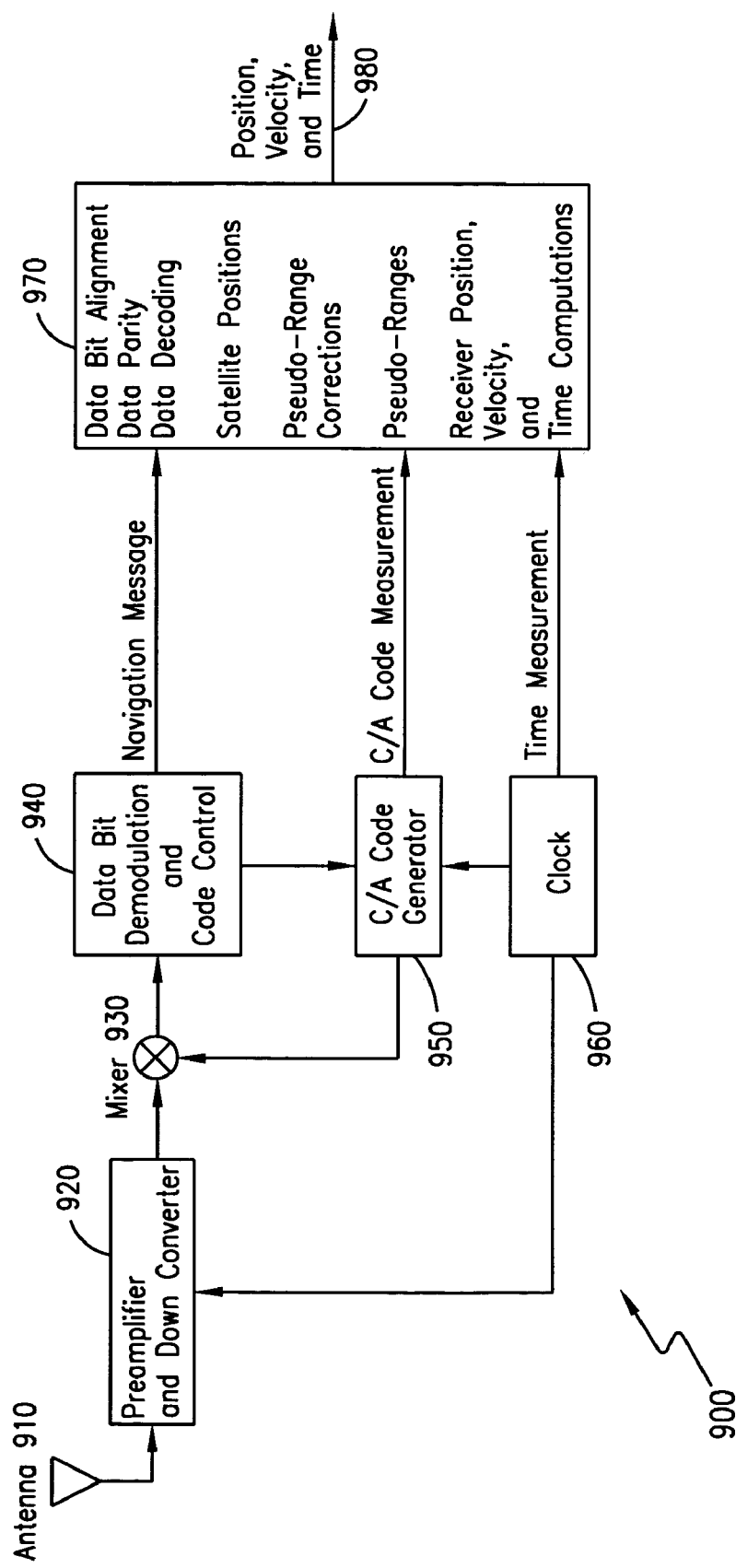
FIG. 9 shows a simplified GPS receiver block diagram.
Figure 10:
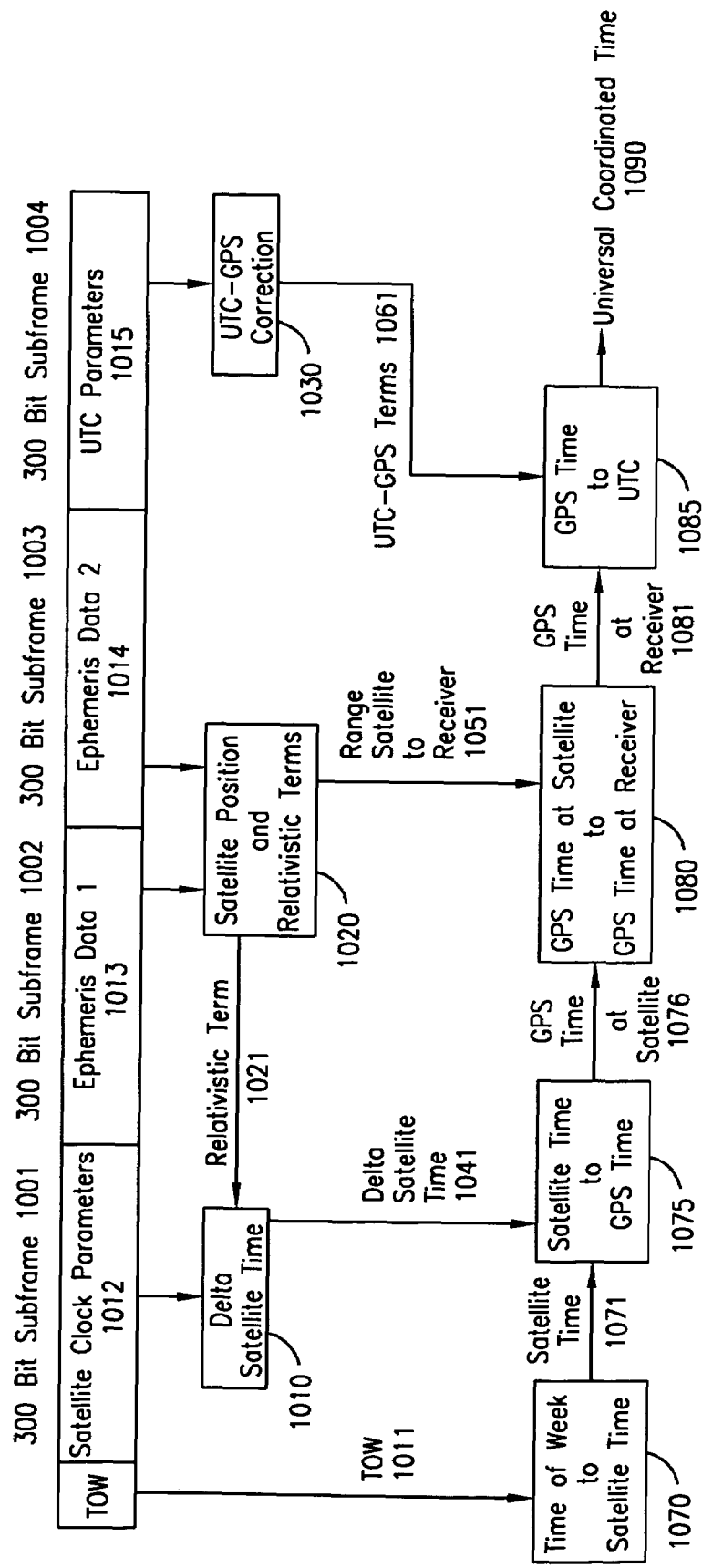
FIG. 10 is a block diagram illustrating the steps in determining the Universal Coordinated Time (UTC) from GPS satellite signals.

A simplified GPS receiver block diagram is shown in FIG. 9. The exemplary GPS receiver 900 receives the navigation message from the GPS satellite via antenna 910. The radio frequency signal is received with the antenna is then fed to the preamplifier and down converter 920. A clock signal from the clock 960 is supplied as an input to the preamplifier and down converter 920. A C/A code generator 950 driven by the clock 960 generates a set of code chips that is fed to a mixer 930 along with the output of the preamplifier 920. The output of the mixer 930 is fed to a data bit demodulation and code control unit 940 to yield the Navigational Data message in the GPS carrier signal.

In one embodiment of the present invention, a phase-locked loop that locks to either a positive or negative hop cycle (i.e., a bi-phase lock loop) is used to demodulate the 50 Hz navigation message from the L1 GPS carrier signal. The same loop can also be used to measure and track the carrier frequency (i.e., the Doppler shift) and, by keeping track of the changes to the numerically controlled oscillator, the phase of the L1 carrier frequency can also be tracked and measured. The processing unit 970 in the GPS receiver uses the navigational message generated by the data bit demodulation and code control unit 940, along with the C/A code measurement from the C/A code generator 950, and the time measurement from the clock 960 to generate the position, velocity and time 980 of the remote receiver.

The receiver position, velocity and time in Cartesian coordinates is converted within the receiver to geodetic latitude, longitude and height estimates above a reference ellipsoid. The velocity at the receiver is computed from changes in position over time, the satellite doppler frequency or both. The time at the remote receiver is computed in terms of the satellite time, the GPS time and/or the UTC time. The satellite time is the time maintained by each satellite. Each satellite contains four atomic clocks (two cesium-based and two rubidium-based). Satellite clocks are monitored by ground control stations and occasionally reset to maintain time to within 1 ms of the true GPS time as maintained at the Master Control Facility. Clock correction data bits reflect the offset of each satellite from the GPS time. The satellite time is set in the receiver from the GPS signals.

Navigational data subframes are transmitted every six seconds and contain bits that resolve the Time of the Week (TOW) to within six seconds. The 50 Hz GPS navigational data bit stream is aligned with the C/A code transitions so that the arrival time of a data bit edge on a 20 ms interval resolves the pseudo range to the nearest millisecond. The approximate range to the satellite resolves the 20 ms ambiguity, and the C/A code measurements can represent times to fractional milliseconds. The use of multiple satellites and a navigational solution (or a known position of a timing receiver) permit the satellite time to be set to an accuracy that is limited only by the position error and the pseudo range error for each satellite.

The first subframe 1001 of the navigational data frame 800 contains the Time of the Week (TOW) estimate 1011 along with the satellite clock parameters 1012. The Time of the Week estimate 1011 is fed to a converter unit 1070 that converts it to a satellite time estimate 1071. The second and the third subframes (1002 and 1003 respectively) of the navigational data frame 800 contain ephemeris data 1013 & 1014, respectively, that are fed to a converter unit 1020 that extracts the relativistic term 1021 as well as the range 1051 of the satellite from the receiver.

The relativistic term 1021 along with the satellite clock parameters 1012 are fed to a satellite time correction unit 1010 to generate the relative difference between the satellite time and the GPS time. This correction 1041 to the satellite time is fed to a correction unit 1075 along with the satellite time estimate 1071 to yield the GPS time 1076 at the satellite. The range estimate 1051 of distance between the receiver and the satellite is then used to convert the GPS time at the satellite 1076 to the GPS time at the receiver 1081 in a conversion unit 1080.

The fourth subframe 1004 of the navigational data message 800 contains UTC parameters 1015 that are fed to a UTC-to-GPS correction unit 1030 to yield the UTC-to-GPS correction term 1061. The UTC-to-GPS correction term 1061 is then fed along with the GPS time at the receiver 1081 to a GPS-to-UTC converter 1085 to yield the correct Universal Coordinated Time (UTC) 1090 at the receiver.

As noted earlier the startup of a GPS receiver typically requires the acquisition of a set of navigational parameters from the navigational data signals of four or more GPS satellites. This process of initializing a GPS receiver may often take several minutes.

The duration of the GPS positioning process is directly dependent upon how much locational and time information that a GPS receiver has. Most GPS receivers are programmed with almanac data, which coarsely describe the expected satellite positions for up to one year ahead. However, if a GPS receiver does not have some knowledge of its own approximate location, then the GPS receiver cannot correlate signals from the visible satellites fast enough, and therefore, cannot calculate its position quickly.

Furthermore, it should be noted that a higher signal strength is needed for capturing the C/A Code and the NAV Code at start-up than is needed for continued monitoring of an acquired signal. It should also be noted that the process of monitoring the GPS signal is significantly affected by environmental factors. Thus, a GPS signal which may be easily acquired in the open becomes progressively harder to acquire when a receiver is under foliage, in a vehicle, or worst of all, in a building.

Recent governmental mandates, e.g., the response time requirements of the FCC Phase II E-911 service, have made it imperative that the exact position of a mobile handset be determined in an expedited manner. Thus, in order to implement a GPS receiver effectively within a mobile terminal while also meeting the demands for expedited and accurate positioning, it has become necessary to be able to quickly provide mobile terminals with accurate assistance data, e.g., local time and position estimates, satellite ephemeris and clock information (which may vary with the location of the mobile station). The system and method of the present invention can permit a GPS receiver that is integrated with or connected to a mobile station to use such assistance data to expedite the completion of its start-up procedures. The present invention offers a technique to send the necessary assistance GPS information over a GSM wireless network to a GPS receiver that is integrated with or connected to a mobile terminal.

Figure 11:
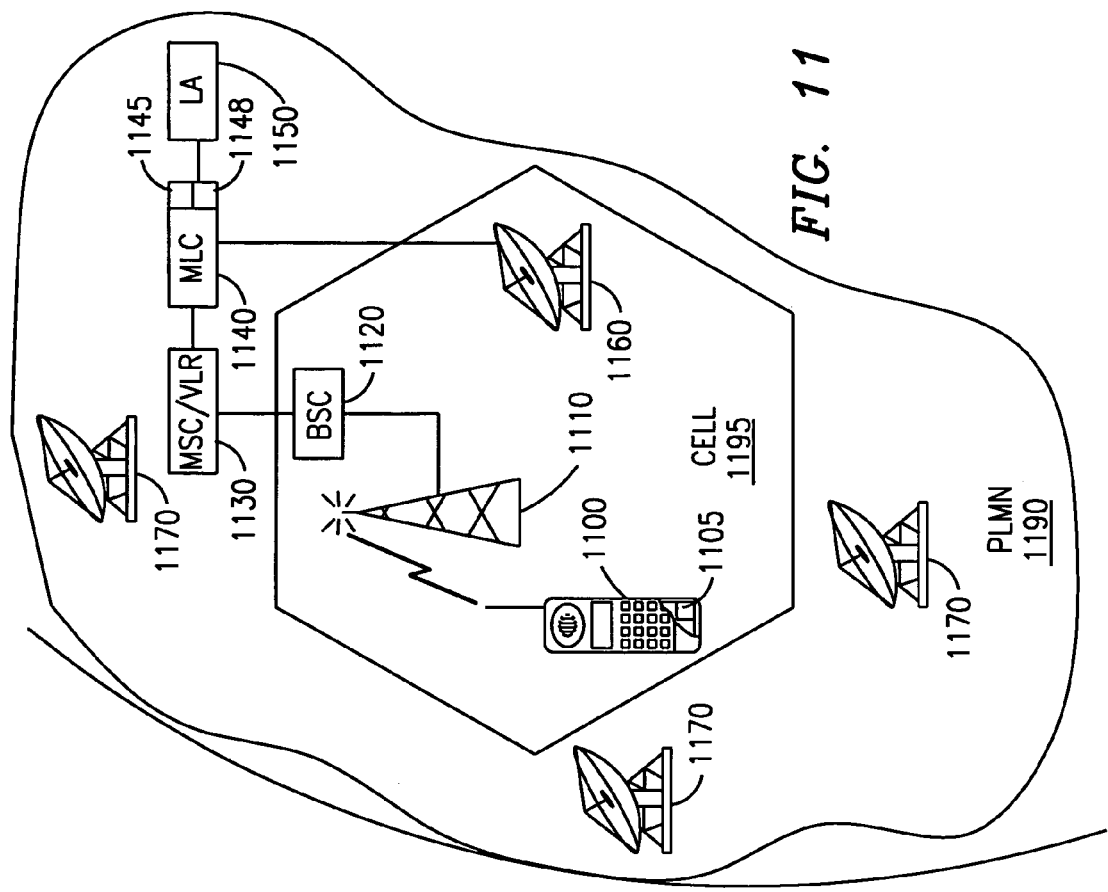
FIG. 11 illustrates positioning of a mobile terminal within a cellular network using the Global Positioning System.
Figure 11:
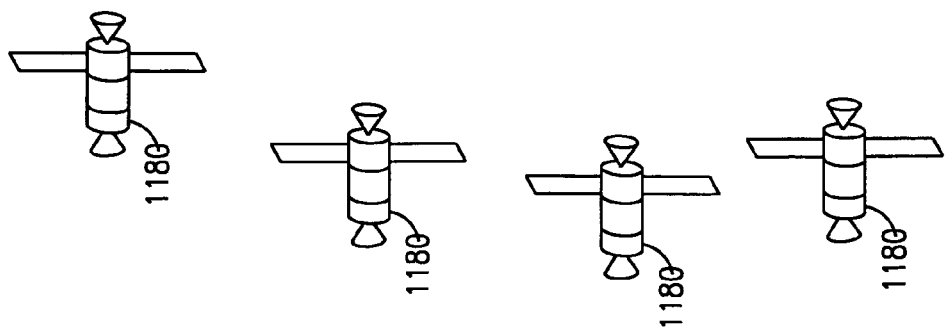

The system and method of the present invention can be best explained by reference to FIG. 11 of the drawings, wherein a requesting Location Application (LA) 1150 requests information about the position of a Mobile Station (MS) 1100 within a Public Land Mobile Network (PLMN) 1190, the positioning request is forwarded to a Mobile Location Center 1140 serving the PLMN 1190. It should be noted that the LA 1150 can be an external node, within the cellular PLMN network 1190, or within the MS 1100 itself. Thereafter, the MLC 1140 requests, from a Mobile Switching Center/Visitor Location Register (MSC/VLR) 1130 serving the area that the MS 1100 is in, the cell ID corresponding to a cell 1195 that the MS 1100 is currently located in. If the MS 1100 is in idle mode, e.g., not in use, the MLC 1140 can then instruct the MSC/VLR 1130 to page the MS 1100 via a Base Station Controller (BSC) 1120 and a serving Base Transceiver Station (BTS) 1110 to determine the cell ID for the cell 1195 that the MS 1100 is located in. This cell ID is then sent back to the MLC 1140 from the MSC/VLR 1130. If, however, the MS 1100 is in busy mode, e.g., in use, the cell ID information is already known by the MSC/VLR 1130 and is sent by the MSC/VLR 1130 to the MLC 1140, upon request.

Once the MLC 1140 receives the cell ID from the MSC/VLR 1130, the MLC 1140 can determine the coordinates of the serving BTS 1110, which preferably serves as the initial local position estimate for the MS 1100, and from this information, using, for example, a look-up table 1145, the MLC 1140 can determine a reference GPS receiver 1160, which is valid for the cell 1195 that the MS 1100 is located in.

Alternatively, the MLC 1140 can determine the correct reference GPS receiver 1160 just from the cell ID, using another look-up table 1145. In addition, alternative ways of determining the correct reference GPS receiver 1160 can be used instead of the look-up table 1145 described herein. Alternatively, certain countries may have regulations against transmitting cell-site location information. In this case, the local position estimate can be quantized to approximately one-kilometer granularity, which can then be used to determine the correct reference GPS receiver 1160.

Multiple reference GPS receivers 1160 and 1170 are spaced throughout the PLMN 1190 in order to provide accurate assistance GPS data to GPS receivers 1105 within or attached to MS's 1100. This data is used by the GPS receiver 1105 incorporated in or associated with a mobile terminal to determine the location of the MS 1100 within the PLMN 1190. The data in each reference GPS receiver 1160 and 1170 is valid in a radius of up to 300 kilometers around the reference GPS receiver 1160 and 1170 site (except for differential correction information, which is only valid for a radius of up to 50 kilometers), and therefore, the correct reference GPS receiver 1160 for the cell 1195 that the MS 1100 is in must be determined to ensure the accuracy of the assistance GPS data. In addition, each reference GPS receiver 1160 and 1170 must be placed such that the antenna has an unobstructed view of the full sky.

After the MLC 1140 has determined the correct reference GPS receiver 1160, the MLC 1140 then obtains, from the reference GPS receiver 1160, the relevant assistance GPS data, such as the identity of the visible satellites 1180, the orbital parameters of the satellites 1180, clock corrections and differential corrections. A current requirement is that this assistance data to be updated by the reference GPS receivers 1160 and 1170 about every thirty minutes (except for differential corrections, which are updated about every five seconds).

In alternative embodiments, the differential corrections can be sent from the correct reference GPS receiver 1160 to the MLC 1140 and then be forwarded to the serving BTS 1110 for that cell 1195 to be broadcast on, for example, a Broadcast Control Channel (BCCH), to MS's 1100 within the cell 1195 about every five seconds. Therefore, this information does not need to be collected by the MLC 1140 when a positioning request comes in and then subsequently sent to the MS 1100 to be positioned, which could take more than five seconds. Advantageously, by continuously broadcasting the differential corrections every five seconds, the MS 1100 will always have updated differential correction information.

The MLC 1140 can collect the assistance GPS data by querying the correct reference GPS receiver 1160 for the latest assistance GPS data when a positioning request comes in. Alternatively, each reference GPS receiver 1160 and 1170 within the PLMN 1190 can update the MLC 1140, e.g., every thirty minutes, and store, within a database 1148 within the MLC 1140, the current assistance GPS data for that reference GPS receiver 1160 and 1170. Thus, when a positioning request comes in, the MLC 1140 need only access that stored information associated with the correct reference GPS receiver 1160 when the correct reference GPS receiver 1160 is ascertained. In either case, once the current assistance GPS data is obtained by the MLC 1140, this information is forwarded to the built-in or attached GPS receiver 1105 within the MS 1100 via the MSC/VLR 1130, BSC 1120 and BTS 1110. For example, the current assistance data can be sent to the MS 1100 within a Short Message Service (SMS) message.

Using this assistance GPS data, the built-in GPS receiver 1105 within the MS 1100 can calculate its position, e.g., latitude and longitude, and send this location information back to the MLC 1140, in, for example, an SMS message. Thereafter, the MLC 1140 can forward the location of the MS 1100 to the requesting Location Application (LA) 1150.

Advantageously, by providing the MS 1100 with an integrated GPS receiver 1105 and the necessary assistance GPS data, the integrated GPS receiver 1105 can calculate its position relatively quickly. Without this information, a GPS receiver 1105 typically requires between approximately 15 seconds and 30 minutes. However, with the provisioning of the assistance GPS data to the GPS receiver 1105 within the MS 1100 through the cellular network 1190, positioning can potentially be performed within about 5 seconds. In addition, the accuracy of the MS 1100 location can be improved to a radius of about 5 meters with the differential correction information, instead of the radius of a cell (500 m to 35 km radius) or a location area, as in previous solutions.

It should be noted that the location services can be used by applications located-in or connected-to the subscriber's MS, by network applications or by external applications. Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

Figure 12:
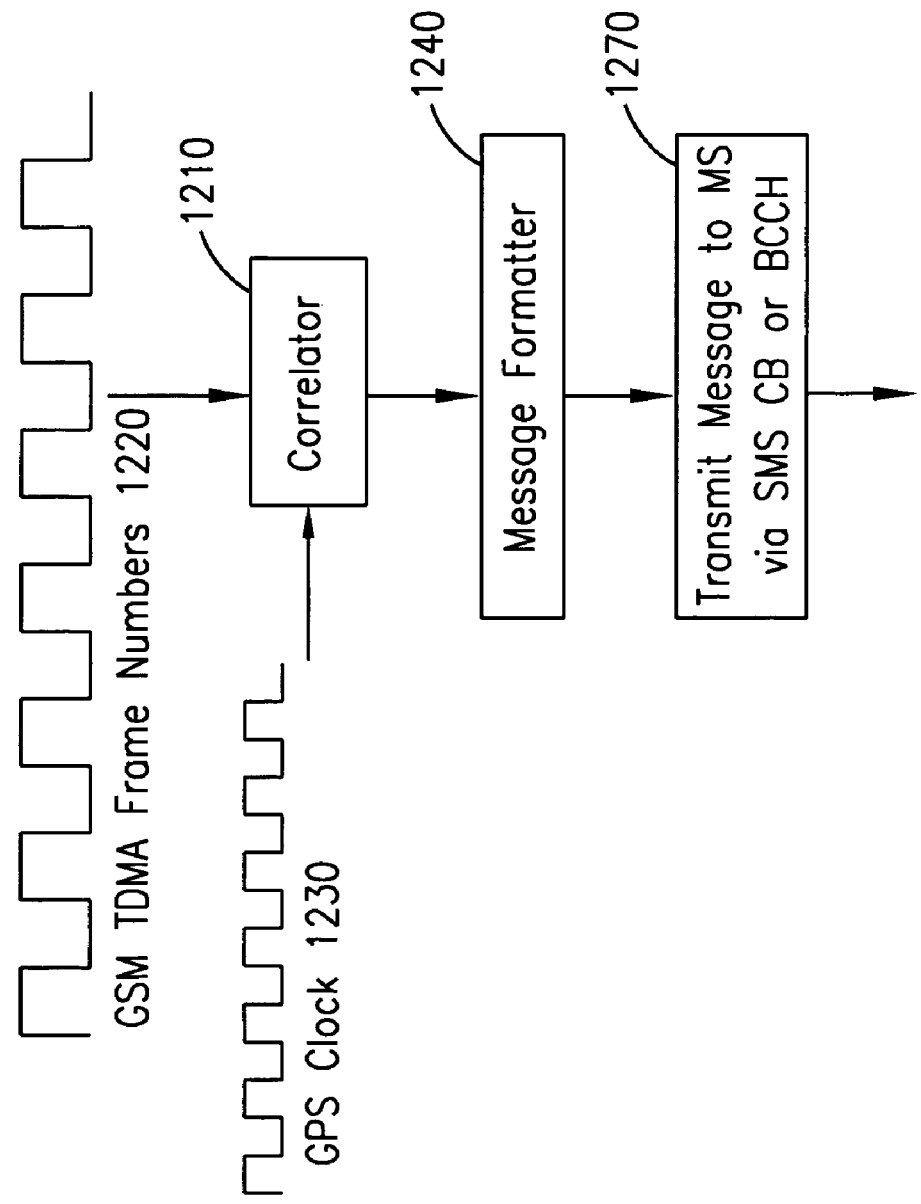
FIG. 12 demonstrates steps in a sample positioning of a mobile terminal using GPS in accordance with preferred embodiments of the present invention.

FIG. 12 shows the use of a timing reference between the GPS clock signal and the GSM TDMA frame number that permits the accurate and speedy estimation of the location of a mobile GPS receiver that is integrated with or connected to a mobile terminal. As noted earlier, fast code start is very important in order to implement the FCC Phase II E-911 response time requirements. In the preferred embodiment of the present invention, the GSM TDMA frame numbers 1220 are correlated with the GPS time at a reference receiver 1230. This correlator 1210 can reside either in the network or at the Base Station Controller (BSC). The correlation is then broadcast to the mobile station through the cell broadcast (CB) feature of the GSM Short Messaging Service (SMS) or through the GSM Broadcast Control Channel (BCCH) as system information. In a further embodiment of the present invention, the use of the time-delay parameter in the mobile terminal may be used to refine the GPS time estimates at the mobile station and can thus be used to permit a mobile to speedily estimate its proximate position during the startup of an GPS receiver that is integrated with the mobile terminal.

Although preferred embodiments of the method and apparatus of the present invention have been illustrated in the accompanying drawings and described in the foregoing detailed description, it is to be understood that the invention is not limited to the exemplary embodiments disclosed, but is capable of numerous rearrangements, modifications and substitutions without departing from the spirit of the invention as set forth and defined by the following claims.

What is claimed is:

1. A method of expediting startup procedures of a Global Positioning System (GPS) receiver associated with a mobile terminal, the mobile terminal connected to a wireless telecommunications system having a Base Transceiver Station (BTS), the BTS having operational control of the GPS-equipped mobile terminal, the method comprising the steps of:

positioning a number of reference GPS receivers throughout the wireless telecommunications system, each reference GPS receiver capable of providing assistance GPS data, including identity of visible GPS satellites and associated orbital parameters, clock corrections and differential corrections;

sending a request from the GPS-equipped mobile terminal to the BTS for approximate navigational data;

utilizing the BTS location as an initial position estimate for the GPS-equipped mobile terminal and as a criterion for selecting one of the number of reference GPS receivers nearest the GPS-equipped mobile terminal;

utilizing a timing reference between a GPS clock signal and a frame number, wherein the timing reference comprises a correlation between the frame number and the GPS clock signal at the selected reference GPS receiver and broadcasting the correlation to the GPS-equipped mobile terminal;

retrieving relevant GPS assistance data from the selected reference GPS receiver;

the BTS sending navigational data, comprising the relevant assistance GPS data, to the GPS-equipped mobile terminal for estimating the current position of the GPS-equipped mobile terminal; and utilizing the navigational data to acquire GPS signals from optimally situated GPS satellites.

2. The method according to claim 1, wherein the step of estimating the current position of the GPS-equipped mobile terminal further comprises determining a cell ID corresponding to the cell in which the GPS-equipped mobile terminal is currently located.

3. The method according to claim 1 wherein the step including selecting one of a number of reference GPS receivers further comprises determining the coordinates of the selected reference GPS receiver in a look-up table.

4. The method according to claim 1, wherein the step of sending a request to the BTS for approximate navigational data is responsive to activation of the mobile terminal.

5. The method according to claim 1, wherein the step of sending a request to the BTS for approximate navigational data is responsive to placing a call from the GPS-equipped mobile terminal to one of a set of designated numbers.

6. The method according to claim 5, wherein the one designated number is associated with an emergency service.

7. The method according to claim 1, wherein the method further comprises, after the step of retrieving the relevant assistance data, the step of storing an estimated location of the one of the reference GPS receivers in said wireless telecommunications system.

8. An arrangement for expediting startup procedures of a Global Positioning System (GPS) receiver associated with a mobile terminal, the mobile terminal connected to a wireless telecommunications system having a Base Transceiver Station (BTS), the BTS having operational control of the GPS-equipped mobile terminal, the arrangement comprising:

a number of reference GPS receivers positioned throughout the wireless telecommunications system, each reference GPS receiver capable of providing assistance GPS data, which includes identified visible GPS satellites and associated orbital parameters, clock corrections and differential corrections;

means for initiating a request from the GPS-equipped mobile terminal to the BTS for approximate navigational data;

means utilizing the BTS location as an initial position estimate for the GPS-equipped mobile terminal as a criterion for selecting one of the number of reference GPS receivers nearest the GPS-equipped mobile terminal;

means for utilizing a timing reference between a GPS clock signal and a frame number, wherein the timing reference comprises a correlation between the frame number and the GPS clock signal at the selected reference GPS receiver and broadcasting the correlation to the GPS-equipped mobile terminal;

retrieval means for retrieving the relevant assistance data from the selected reference GPS receiver;

means associated with the BTS for sending navigational data, comprising the relevant assistance GPS data, to the GPS-equipped mobile terminal for estimating the current position of the GPS-equipped mobile terminal; and means for utilizing the navigational data to acquire the GPS signals from optimally situated GPS satellites.

9. The arrangement according to claim 8, wherein the GPS-equipped mobile terminal further includes means for determining a cell ID corresponding to the cell in which the GPS-equipped mobile terminal is currently located.

10. The arrangement according to claim 8, wherein the means including selecting one of a number of reference GPS receivers, further comprises means for determining the coordinates of the selected reference GPS receiver in a look-up table.

11. The arrangement according to claim 8, wherein the means for sending a request to the BTS for approximate navigational data is responsive to activation of the mobile terminal.

12. The arrangement according to claim 8, wherein the means for sending a request to the BTS for approximate navigational data is responsive to placing a call from the GPS-equipped mobile terminal to one of a set of designated numbers.

13. The arrangement according to claim 12, wherein the one designated number is associated with an emergency service.

14. The arrangement according to claim 8, further comprising means for storing an estimated location of the one of the reference GPS receivers in said wireless telecommunications system.

15. A method of expediting startup procedures of a Global Positioning System (GPS) receiver associated with a mobile terminal, the mobile terminal connected to a wireless telecommunications system having a Base Transceiver Station (BTS), the BTS having operational control of the GPS-equipped mobile terminal, the method comprising the steps of:

positioning a number of reference GPS receivers throughout the wireless telecommunications system, each reference GPS receiver capable of providing relevant assistance GPS data, which includes identified visible GPS satellites and orbital parameters, clock corrections and differential corrections associated with the visible GPS satellites;

sending a request from the GPS-equipped mobile terminal to the BTS for approximate navigational data;

utilizing the BTS location as an initial position estimate for the GPS-equipped mobile terminal as a criterion for selecting one of the number of reference GPS receivers nearest the GPS-equipped mobile terminal;

utilizing a timing reference between a GPS clock signal and a frame number, wherein the timing reference comprises a correlation between the frame number and the GPS clock signal at the selected reference GPS receiver and broadcasting the correlation to the GPS-equipped mobile terminal;

retrieving relevant assistance data from the selected reference GPS receiver;

the BTS sending navigational data, comprising the relevant assistance GPS data, to the GPS-equipped mobile terminal for estimating the current position of the GPS-equipped mobile terminal;

periodically transmitting a Timing Advance parameter from the Base Transceiver Station to the GPS-equipped mobile terminal to dynamically compensate for varying distances between the GPS-equipped mobile terminal and the Base Transceiver Station;

refining the approximate location of the GPS-equipped mobile terminal using the Timing Advance parameter; and utilizing the navigational data to acquire the GPS signals from optimally situated GPS satellites.

16. The method of claim 15, wherein the step of estimating the current position of the GPS-equipped mobile terminal further comprises the steps of:

recovering respective navigational data signals from demodulated GPS signals from the GPS satellites; and determining, from the respective navigational data signals, the location of the reference GPS receiver.

17. A method of expediting startup procedures of a Global Positioning System (GPS) receiver associated with a mobile terminal, the mobile terminal connected to a wireless telecommunications system having a Base Transceiver Station (BTS), the BTS having operational control of the GPS-equipped mobile terminal, the method comprising the steps of:

positioning a number of reference GPS receivers throughout the wireless telecommunications system, each reference GPS receiver capable of providing assistance GPS data, which includes identified visible GPS satellites and orbital parameters, clock corrections and differential corrections associated with the visible GPS satellites;

determining whether the GPS signal strength at the GPS-equipped mobile terminal is adequate to permit initialization of the reference GPS receiver associated with the GPS-equipped mobile terminal within a desired response time;

if not, sending a request from the GPS-equipped mobile terminal to the BTS for approximate navigational data;

utilizing the BTS location as an initial position estimate for the GPS-equipped mobile terminal and as a criterion for selecting one of the number of reference GPS receivers nearest the GPS-equipped mobile terminal;

utilizing a timing reference between a GPS clock signal and a frame number, wherein the timing reference comprises a correlation between the frame number and the GPS clock signal at the selected reference GPS receiver and broadcasting the correlation to the GPS-equipped mobile terminal;

retrieving relevant assistance data from the selected reference GPS receiver;

the BTS sending navigational data, comprising the relevant assistance GPS data, to the GPS-equipped mobile terminal for estimating the current position of the GPS-equipped mobile terminal; and utilizing the navigational data to acquire the GPS signals from optimally situated GPS satellites.

* * * * *